United States Patent [19]

Prell et al.

[11] 4,074,079

[45] Feb. 14, 1978

[54] COIN TELEPHONE ANTIFRAUD SYSTEM

[75] Inventors: Edward Myron Prell, St. Charles; Barry William Rogers, Geneva, both of Ill.

[73] Assignee: Bell Telephone Laboratories, Incorporated, Murray Hill, N.J.

[21] Appl. No.: 692,208

[22] Filed: June 2, 1976

[51] Int. Cl.$^2$ .......................................... H04M 17/00
[52] U.S. Cl. ............................. 179/6.3 R; 179/1.5 R
[58] Field of Search ..................... 179/6.3 R, 6.31, 6.4, 179/6.5, 15 BA, 15 BV, 1.5 R, 1.5 S

[56] References Cited

U.S. PATENT DOCUMENTS

| 3,012,100 | 12/1961 | Mitchell | 179/1.5 R |
|---|---|---|---|
| 3,428,751 | 2/1969 | Edington | 179/6.3 R |
| 3,624,297 | 11/1971 | Chapman | 179/1.5 R |
| 3,696,207 | 10/1972 | Lundin et al. | 179/1.5 R |
| 3,760,104 | 9/1973 | Thompson et al. | 179/6.3 R |
| 3,886,313 | 5/1975 | Branscome et al. | 179/1.5 S |
| 3,952,160 | 4/1976 | Pasternack et al. | 179/6.31 |
| 3,953,677 | 4/1976 | Gannett | 179/1.5 R |
| 3,991,271 | 11/1976 | Branscome et al. | 179/1.5 R |

OTHER PUBLICATIONS

"Is Automatic Long Distance Coin Calling Possible?" Telephone pp. 75-78, Jan. 21, 1974.
"Automization of Coin Toll Calls and Upgrading the Coin Telephone Service of Single Slot Paystations" Jour. of Nat. Telecommunication Conference Nov. 26, 1973, pp. 10D-1-10D-4.

Primary Examiner—Kathleen H. Claffy
Assistant Examiner—Gerald L. Brigance
Attorney, Agent, or Firm—Martin S. Landis; Kenneth H. Samples

[57] ABSTRACT

This invention relates to coin-operated telephones and apparatus for preventing the accidental or fraudulent simulation of coin deposit signals. At the beginning of each coin call or overtime period, a coding algorithm is randomly chosen at the coin station and the identity of the chosen algorithm is transmitted over the telephone line to a receiving telephone office. For each coin deposited, the coin station generates accumulated coin deposit information, codes it in accordance with the chosen algorithm and then transmits the coded accumulated deposit information to the telephone office. The office decodes the received information in accordance with the chosen algorithm identity information previously received at the telephone office to ascertain the amount deposited at the coin station.

11 Claims, 2 Drawing Figures

COIN TELEPHONE ANTIFRAUD SYSTEM

FIELD OF THE INVENTION

This invention relates to coin-operated telephones and, more specifically, to apparatus for preventing the accidental or fraudulent generation of coin deposit signals.

BACKGROUND OF THE INVENTION

An essential part of each coin-operated telephone is apparatus responsive to the deposit of a coin for generating signals indicative of the value of the deposit. In one prior art coin telephone, each deposited coin strikes a distinctive gong or chime. The sound generated thereby is converted to an electrical signal by means of a transducer and then applied to the telephone line. The operator then interprets the sounds and thereby determines the particular coin deposited.

In another prior art coin-operated telephone station, a switching device is included which operates one or more times in response to the deposit of each coin. Each switch operation is indicative of an incremental coin value such as 5 cents. Each operation of the switch energizes an oscillator that generates an electrical signal burst in the audible frequency range. The bursts are counted by the operator to determine the value of the coin deposited. A system of this type is disclosed in E. R. Andregg et al. U.S. Pat. No. 3,146,312, issued Aug. 25, 1964.

Operators working with the above-described coin identification systems are sometimes confused as to whether signals generated at a TOUCH-TONE ® signal dial are dial signals or coin deposit signals. Unfortunately, certain telephone users attempt to fool the operator into thinking that the requisite coins have been deposited by depressing certain combinations of the pushbuttons to generate series of tones.

J. E. Edington U.S. Pat. No. 3,428,751, issued Feb. 18, 1969, discloses one arrangement that allows the operator to distinguish dialed tones from coin deposit signals. In the Edington arrangement, a distinctive single frequency guard tone is provided at the termination of each dialed signal. Thus if an operator hears this guard tone, he or she then realizes that the preceding tone was generated from the pushbuttons rather than from the deposit of coins. The Edington arrangement appears to be effective in preventing the use of a TOUCH-TONE signaling dial to generate coin deposit signals. However, it is ineffectual in regard to coin deposit signals produced by tape recorders, tone generators or similar devices which signals are entered into the receiver of the coin station to obtain free telephone service.

It is an object of this invention to prevent the fraudulent generation of coin deposit signals.

It is a further object of this invention to provide a mechanism of automating the detection of coin deposit signals to help an operator or automated call-processing system differentiate between valid and invalid coin deposit signals.

SUMMARY OF THE INVENTION

These and other objects are achieved in accordance with the principles of the invention as disclosed in one illustrative embodiment wherein at the beginning of each coin call or overtime period, the coin station randomly choses one of a plurality of coin deposit coding algorithms and transmits the identity of the chosen algorithm to the receiving telephone office. To prevent unauthorized interference with the transmission of the algorithm, the calling coin station is temporarily disabled during the transmission of the identity information.

For each deposit, the coin station generates accumulated coin deposit information, codes it in accordance with the chosen algorithm, and then transmits the coded accumulated deposit information to the telephone office where such information is decoded to ascertain the amount deposited.

More specifically, in this one illustrative embodiment of our invention, the chosen algorithm indicates the number of bit positions that the accumulated coin information is rotated prior to its transmission to the serving telephone office in a frequency shift key (FSK) format. Frequency shift keying is that well-known form of frequency modulation in which the output frequency is shifted between predetermined values. Thus, each time a coin is deposited, the accumulated coin information is updated at the station and then this information is rotated the number of bit positions indicated by the chosen algorithm. The rotated accumulated coin information is then converted to FSK at the coin station and transmitted to an FSK receiver at the serving telephone office. The serving office converts the received FSK information into binary and then rotates the binary information in the opposite direction by the number of bits indicated by the previously received identity information to thereby derive the accumulated coin deposit information.

In accordance with one feature of our invention, the coin station randomly chooses a coding algorithm from a plurality of algorithms available at the coin station and utilizes the chosen algorithm to code coin deposit information for transmission to the serving office.

In accordance with another feature of our invention, accumulated coin deposit information is transmitted each time a coin is deposited. Thus, even though the algorithm remains the same for each coin deposit transmission during a particular aspect of the call, the transmitted coded information is different for each coin transmission because each transmission indicates a different coin amount. For example, in a 20-cent coin call in which a dime and two nickels were deposited, the first coded coin transmission would indicate that a dime had been deposited. The second transmission would indicate 15 cents, and the third transmission would indicate 20 cents. Thus each coin deposit results in the generation of different coin deposit information. This prevents a telephone user from tape recording one coded coin deposit transmission and then playing back the recorded transmission to simulate the next deposited coin. Moreover, during each coded coin deposit transmission, the coin station is disabled to prevent the user from hearing the transmission or interfering with it.

BRIEF DESCRIPTION OF THE DRAWING

The foregoing as well as other objects, features and advantages of our invention will be more apparent from a description of the drawing in which.

GENERAL DESCRIPTION

Figure 2:
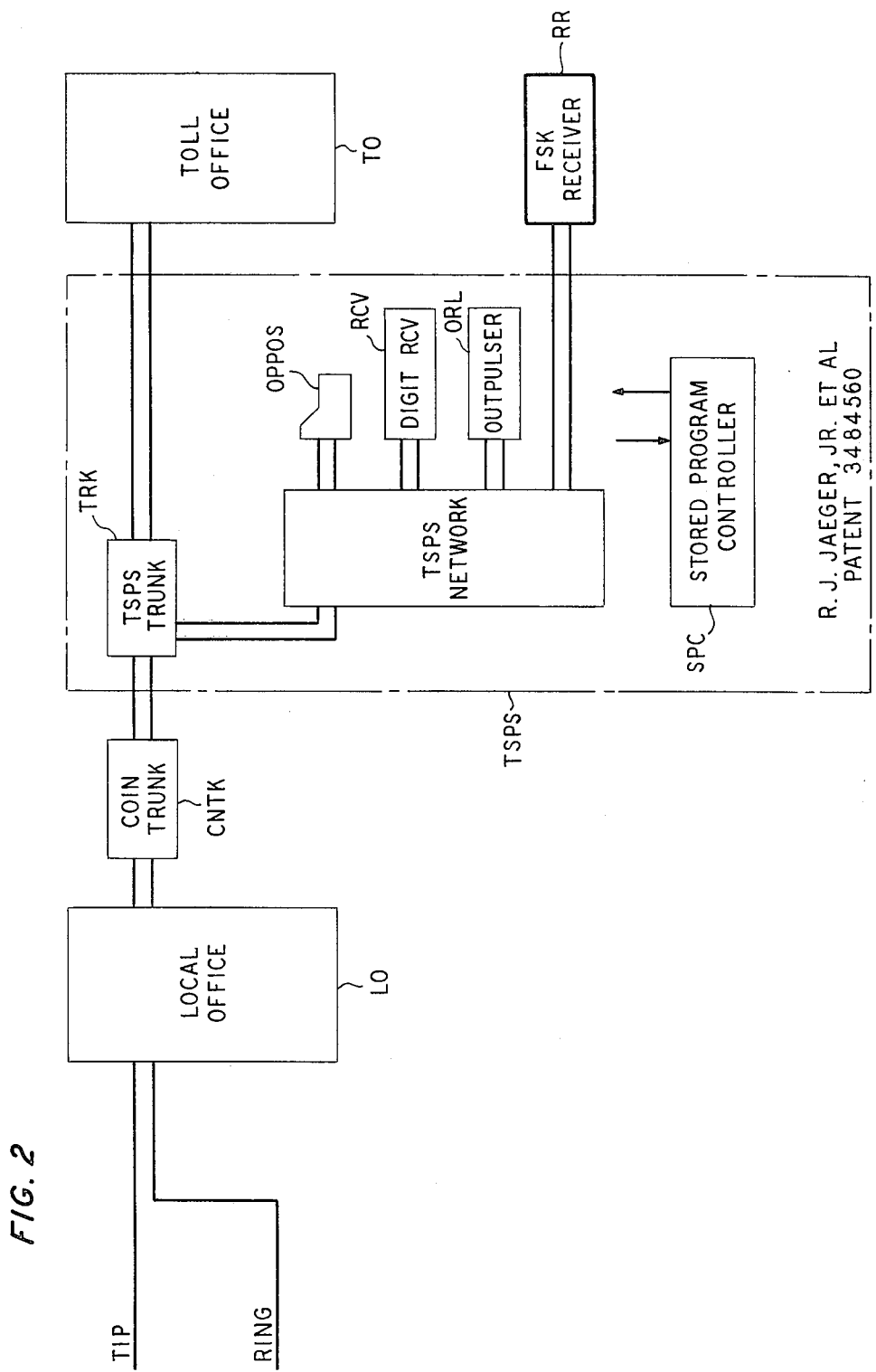
FIG. 2 illustrates how an existing telephone system is modified by the inclusion of an FSK receiver.

To institute a call at a coin telephone station, the calling subscriber lifts the handset and, if required, deposits an initial deposit, normally 10 or 20 cents. Upon detection of the deposit, the local office LO in FIG. 2 returns dial tone. The calling subscriber then dials a number identifying the called station. At some coin stations which operate in conjunction with a system called a Traffic Service Position System (TSPS), the dial digits are preceded by a zero or a one depending upon whether or not operator assistance is requested. This system is described in the December, 1970 issue of the *Bell System Technical Journal* and in R. J. Jaeger, Jr. et al. U.S. Pat No. 3,484,560.

The dialed digits are received at the local office and then outpulsed to the TSPS trunk along with the calling station number, in the normal manner. This information is further directed through the TSPS network to digit receiver RCV. The stored program controller SPC analyzes the received information and connects the TSPS trunk to FSK receiver RR. The SPC simultaneously causes a control signal to be transmitted to coin trunk CNTK to return any coins deposited by the calling subscriber and to select a coding algorithm at the coin station. As described more fully hereinafter, this coin return serves to randomly choose one of the coding algorithms. Once the algorithm is chosen, the identity of the algorithm is transmitted by the coin station to FSK receiver RR in the TSPS in a fixed conventional frequency shift key (FSK) format. The FSK receiver decodes the identity information into its original binary format. The TSPS then stores the identity information in a memory location associated with the calling coin station (i.e., TSPS trunk).

During the transmission of the identity information, the receiver, the switchhook, and the transmitter are disabled at the coin station. This prevents the calling party from overhearing the identity information or from mutilating or disrupting this information.

Figure 1:
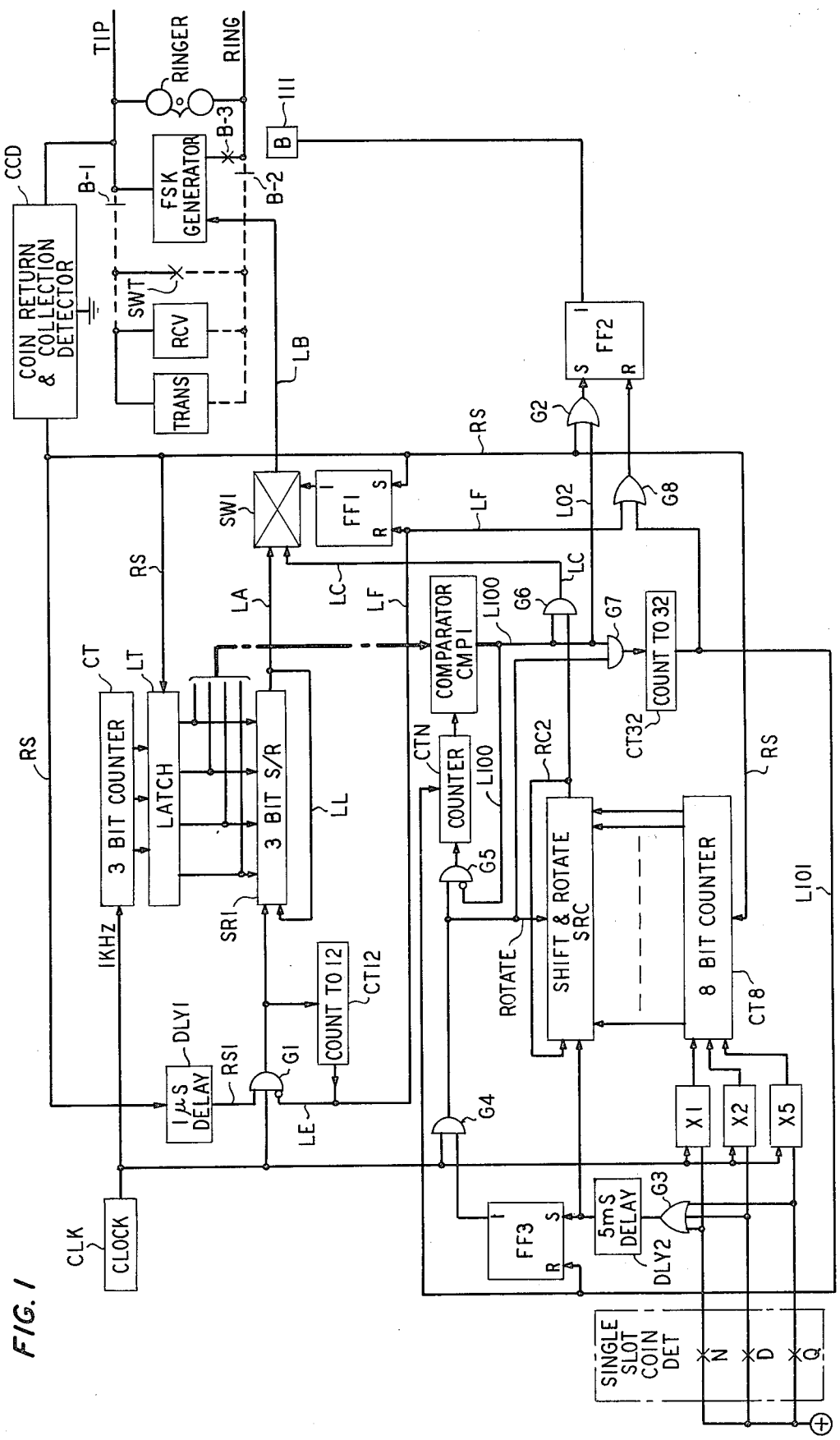
FIG. 1 illustrates the logic circuitry incorporated in a coin station and operable in accordance with the principle of our invention.

Each deposited coin is detected by the normal mechanical lever and cam circuitry (not shown) in the coin station. Such circuitry is adapted to distinguish between nickels, dimes, and quarters based upon the size and weight of the deposited coins. As shown in FIG. 1, counter CT8 is provided to indicate the amount previously deposited during this segment of the call; and each time an additional coin is deposited, the accumulated deposit is indicated by the counter.

In this one illustrative embodiment of our invention, the coding algorithm defines how many bit positions the binary count in the accumulated deposit counter CT8 is shifted prior to its transmission in an FSK format to the telephone office. For example, each coding algorithm indicates the number of bit positions that this count is to be rotated.

Each time a coin is deposited, the accumulated deposit information in the counter is updated; the updated information is then rotated in accordance with the coding algorithm chosen at the institution of the call. The rotated accumulated deposit information is then encoded in an FSK format and transmitted to FSK receiver RR. To decode the information into a usable form, receiver RR first converts the received FSK information into a binary word and then the SPC merely shifts the received information in the opposite direction by the number of bit positions indicated in the identity information transmitted thereto from the coin station at the beginning of the call.

Of course, any type of coding algorithm can be utilized at the coin station including digit transposition, adding dummy bits in specified bit positions, bit inversion, translation tables, etc.

After the telephone office detects that the proper amount has been deposited, it completes the call in the usual manner by outpulsing the called party digits from outpulser ORL to toll office TO, and then the calling and called parties can communicate over the established telephone path including the TSPS trunk.

Normally, the operator at the end of the initial period (which is usually 3 minutes) breaks into the conversation and informs the calling party that the initial period has expired and requests that the calling party signal at the termination of the call so that the proper overtime charges can be assessed. Prior to collecting any overtime charges, the operator controls the coin trunk in the local office to collect the coins already deposited in the coin station and thereby randomly selects another coding algorithm at the coin station and clears the accumulator in the coin station. Alternatively the coin collect control function might cause the next sequential coding algorithm to be selected. The selection sequencing would be known to TSPS. The identity of the new coding algorithm is now transmitted to the telephone office. During this transmission, the calling coin station is again disabled. Subsequent coin deposits are again accumulated. For each coin deposit, accumulated coin deposit information is coded in accordance with the new algorithm and then is transmitted in an FSK format to the telephone office. The FSK receiver RR at the telephone office detects the transmitted identity and coin deposit information. The controller at the TSPS processes the coin deposit information in accordance with the new algorithm identity information. This frees the operator of the task of listening to coin deposit signals and distinguishing these signals from multifrequency tones associated with TOUCH-TONE signaling and other subscriber generated tones.

SPECIFIC DESCRIPTION

With reference to the drawing, when the subscriber lifts the handset at the coin station in FIG. 1 and deposits the initial amount (if required), switch SWT closes to connect together the tip-and-ring leads which extend to the local office. Current then begins flowing through the coin station loop and operates the line relay (not shown) to inform the local office that this coin station requires service. The local office then returns dial tone over the tip-and-ring leads and thereby informs the calling subscriber that dialing may be commenced. The called station digits are normally preceded by a zero or a one in a TSPS served coin station. Coin station-to-station toll calls or coin calls requiring operator assistance are then routed by the local office to TSPS, via coin trunk CNTK. The received digits are outpulsed by the local office to digit receiver RCV.

Prior to requesting the deposit of additional coins, TSPS connects FSK, receives RR to the TSPS trunk and signals the local office to apply the normal 130 volt coin return signal between the tip lead and ground to return the coins at the coin station. This return signal serves to select a coding algorithm as well as to return any coins deposited in the station by the normal mechanism (not shown). Coin return and collection detector CCD in FIG. 1 detects the 130 volt signal on the tip lead and generates a HIGH output on lead RS. This controls latch LT to temporarily store the present count of counter CT. This counter counts from 1 to 8 at a 1 kHz rate and then resets and continues counting responsive to a 1 kHz square wave generated by clock CLK. Thus counter CT at any given instant randomly indicates a number from 1 to 8. The output of latch LT, which indicates the 3-bit randomly chosen count, is input in parallel into 3-bit shift register SR1. After a 1 μs delay developed by circuit DLY1, the HIGH output on lead RS appears as a HIGH output on lead RS1 to enable gate G1 to gate a 1 kHz clock shift signal into register SR1. Responsive to each clock signal applied thereto by gate G1, shift register SR1 shifts its contents one bit position to the right to output one bit of the chosen count (algorithm) on lead LA to switch SW1. Each bit output on lead LA is also reinserted in the left bit position of register SR1 via lead LL.

Switch SW1 serves to direct either the initial algorithm identity information from register SR1 or coded coin deposit information to FSK generator GG, as hereinafter described. This generator encodes the serial binary information applied thereto in a well-known FSK format and transmits the formatted information over the tip-and-ring leads to the TSPS office. More specifically, the HIGH output on lead RS from coin collection detector CCD sets flip-flop FF1. The ONE output of this flip-flop controls switch SW1 to apply the algorithm identity information on lead LA from register SR1 to lead LB for application to FSK generator GG. The HIGH signal on lead RS is also applied to OR gate G2. The HIGH output of this gate sets flip-flop FF2. The ONE output of this flip-flop operates relay B through a suitable relay driver not shown. Contacts B-1 and B-2 open to disconnect the switchhook, the receiver, and the transmitter in the coin station from the tip-and-ring leads. Thus, the coin station is disabled during the transmission of the coding algorithm identity information. Contact B-3 closes to connect FSK receiver GG to the tip-and-ring leads. DC continuity for the loop connection is maintained through FSK generator GG.

The chosen algorithm identity information in shift register SR1 comprises a 3-bit binary count. Thus in this illustrative embodiment, eight distinct coding algorithms are provided. Of course, in other embodiments, the number of chosen algorithms may be increased or decreased as may the complexity of the coding algorithm utilized therein. As mentioned previously, the three bits in register SR1 are gated out in serial and applied via leads LA, switch SW1, and lead LB to generator GG. At the same time these three bits are reinserted in register SR1 via lead LL. Circuit CT12 counts the number of shift signals applied to register SR1 and when the 12th shift signal is counted, circuit CT12 generates a HIGH signal on lead LE disabling gate G1. Thus the three bits in register SR1 are transmitted four times to the receiving telephone office by generator GG. The HIGH output of counter CT12 also resets flip-flop FF1 via lead LF. The ONE output of this flip-flop goes LOW so that for any subsequent serial information, switch SW1 will connect lead LC to lead LB. Flip-flop FF2 is also reset by the HIGH signal on lead LF by gate G8. This releases relay B, reactivating transmitter TRANS, receiver RCV and switchhook SWT.

The TSPS detects the transmitted FSK algorithm identity information in FSK receiver RR. The receiver converts the serial FSK information into a 12-bit data word. The SPC processor in TSPS derives the 3-bit code from the redundant 12-bit data word. The SPC then stores this algorithm identity number in a memory location associated with the particular TSPS trunk which is connected to the calling coin station.

The TSPS then connects an operator position such as OPPOS to the TSPS trunk. The operator then informs the calling party of the initial deposit.

Eight-bit counter CT8 in FIG. 1 stores accumulated deposit information for the call. This counter was previously cleared by the HIGH signal on lead RS when the coding algorithm was chosen. Each time a nickel is deposited, symbolic nickel contact N is closed indicating to the circuitry that a nickel has been deposited. Similarly, symbolic contacts D and Q close when a dime or a quarter has been deposited, respectively. Each time one of the N, D or Q contacts closes, a predetermined number of clock pulses are applied to counter CT8. For a nickel, one pulse is applied by multiplier X1; for a dime, two pulses are applied by multiplier X2; and for a quarter, five pulses are applied by multiplier X5. Thus, counter CT8 indicates in a binary format the number of 5-cent deposit increments which have been detected.

Let us assume that 3-bit counter CT indicated the binary count 011 (or 3) when the coin return signal was detected and latch LT was energized; and further let us assume that 20 cents is required to complete the call. If the subscriber deposits a dime, the D contact closes and circuit X2 allows two clock pulses to enter counter CT8. This counter would then indicate the binary word 00000010 (i.e., 2). The closure of contact D is also detected by OR gate G3 which applies a HIGH signal to delay circuit DLY2. After 5 ms, the output of circuit DLY2 goes HIGH setting flip-flop FF3. The HIGH output of circuit DLY2 is also applied to shift and rotate circuit SRC which responsive thereto inputs the 8-bit word indicated by counter CT8. The ONE output of flip-flop FF3 goes HIGH enabling gate G4 to apply rotate signals to circuit SRC. For each shift signal, circuit SRC shifts its binary contents one bit position to the right and, at the same time, reinserts the shifted bit into the leftmost bit position via lead RC2. Each shift pulse output from gate G4 is also applied to counter CTN via gate G5. Comparator CMP1 is responsive to the count indicated by counter CTN and the chosen count indicated by latch circuit LT (i.e., 3 in binary). When the counts match (i.e., after 3 shift pulses), the accumulated deposit information in circuit SRC (2 in binary) has been shifted the proper number of bit positions. Comparator CMP1 then generates a HIGH output of lead L100 to disable gate G5 and at the same time to enable gate G6 to gate out the properly coded accumulated coin deposit information in circuit SRC to switch SW1 via lead LC. Since flip-flop FF1 is reset as described previously, the coded accumulated coin deposit information on lead LC is applied by switch SW1 via lead LB to FSK generator GG and then transmitted to FSK receiver RR.

Comparator CMP1 also enables gate G7 via lead L100 after the coin deposit information has been rotated the proper number of bit positions. Then each time gate G4 applies a rotate signal to circuit SRC, gate G7 generates a HIGH output which is counted by counter CT32. When the count reaches 32, indicating that the 8-bit count in register SRC has been transmitted in succession four times to the receiving telephone office, counter CT32 generates a HIGH signal on lead L101 to reset flip-flop FF3 and counter CTN. The ONE output of flip-flop FF3 then goes LOW disabling gate G4 and preventing the further shifting of information from circuit SRC. Thus, receiver RR receives the coded accumulated deposit information as a 32-bit FSK word. Receiver RR connects this word into binary. The SPC then compares the redundant 8-bit bytes and derives the coded 8-bit coin deposit word. The SPC then rotates the coded 8-bit word to the left by the number of bit positions (i.e., 3) indicated by the previously received algorithm identity information to derive accumulated binary deposit information which is compared with the required deposit.

During each transmission of accumulated deposit information, relay B is activated to disable the switchhook, receiver, and transmitter at the coin station. More specifically, the output of comparator CMP1 which indicates that the accumulated coin information has been rotated in accordance with the chosen coding algorithm and now is to be transmitted to the coin station, also applies a HIGH input to gate G2 over lead LO2. The HIGH output of gate G2 sets flip-flop FF2 thereby operating relay B. When counter CT32 generates a HIGH output indicating the termination of the coin information transmission, this output is applied to OR gate G8 which resets flip-flop FF2 and relay B is again denergized.

If the subscriber now deposits another dime, contact D will close, and circuit X2 generates and applies two pulses to counter CT8. Now the counter will indicate the binary word 00000100 (i.e., "4 nickels"). Since the latched output of counter CT (coding identity) indicates the count three or 011 in binary, circuit SRC is controlled to shift its stored output of counter CT8 three bit positions to the right. Thus, the rotated count would be 10000000. This rotated word is then transmitted in an FSK format to the receiving telephone office four times in succession. Receiver RR receives in FSK the 32-bit binary word 10000000100000001000000010000000. The SPC derives the 8-bit word 10000000 from the redundant 32-bit word and rotates the 8-bit word three bit positions to the left in accordance with the previously received identity information. Thus the SPC generates the binary word 00000100 and thereby determines that four 5-cent increments or 20 cents has been deposited. If 20 cents is the required deposit, the call is then completed in the normal manner.

If the call proceeds into an overtime period, an operator is connected to the coin station via the TSPS network in the normal manner and collects the coins in the coin station. In the manner identical to that described previously, latch LT indicates a new random coding algorithm which represents the then present count of counter CT. This new identity information is then transmitted to the TSPS. The SPC now stores the new identity information in the memory location associated with the TSPS trunk. Coin deposits received during overtime periods are detected and the appropriate accumulated coin deposit information is transmitted in a manner identical to that described previously with the exception that now such coin deposit information is coded in accordance with the new chosen algorithm.

What is claimed is:

1. In a coin station,
choosing means for choosing one of a plurality of coding algorithms,
transmitting means for transmitting the identity of the chosen algorithm to the serving telephone office, and
coding means for coding coin deposit information in accordance with said chosen algorithm.

2. The combination according to claim 1 further comprising means for causing said transmitting means to transmit said coded coin deposit information to the serving telephone office.

3. The combination according to claim 1 wherein said coding means comprises
means for indicating accumulated coin deposit information, and
means responsive to said choosing means and to the deposit of each coin for coding said indicated accumulated coin deposit information in accordance with said chosen algorithm.

4. The combination according to claim 3 wherein said transmitting means comprises a frequency shift key generator for encoding said chosen algorithm identity and said accumulated deposit information into frequency shift key format and then transmitting said encoded information to said serving telephone office.

5. The combination according to claim 1 wherein said choosing means comprises
a clock, a counter counting responsive to clock signals from said clock, and indicating means jointly responsive to said counter and to a coin control signal from the serving telephone office for indicating the instant count in said counter, said instant count indicating the identity of the chosen algorithm.

6. The combination according to claim 5 wherein said coding means comprises a shift register indicating said coin deposit information, control means jointly responsive to a coin deposit and to said indicating means for rotating said coin deposit information in said shift register a number of bit positions having a predetermined relationship to said instant count.

7. The combination according to claim 1 further comprising inhibiting means responsive to said transmitting means for disabling the transmitter, receiver, and switchhook in the coin station during the transmission of said chosen algorithm identity information, and said coded coin deposit information.

8. In a coin station,
choosing means responsive to a coin control signal from a serving telephone office for randomly choosing one of a plurality of coding algorithms,
encoding means for encoding the identity of the chosen algorithm,
transmitting means for transmitting the encoded chosen algorithm identity to the serving telephone office,
accumulating means responsive to the deposit of each coin at said coin station for accumulating the amount deposited for a call, and
means jointly responsive to the deposit of each coin and to said accumulating means for coding said accumulated amount in accordance with said chosen algorithm, and wherein
said encoding means encodes said coded accumulated amount and said transmitting means transmits said encoded accumulated amount to the serving telephone office.

9. The combination according to claim 8 further comprising inhibiting means responsive to said transmitting means for disabling the transmitter, receiver and switchhook of said coin station during the transmission of said algorithm identity information.

10. For use in a telephone system including an office, a coin telephone station and a communication path therebetween, the combination in said coin telephone station comprising
- choosing means responsive to a coin control signal received over the communication path for randomly choosing one of a plurality of coding algorithms,
- transmitting means for transmitting the identity of said chosen algorithm to said office over said communication path,
- means for detecting coins deposited in said coin station,
- indicating means responsive to said last-named means for indicating the cumulative amount deposited for a telephone call, and
- coding means jointly responsive to said detecting means, said indicating means, and said choosing means for coding, in accordance with said chosen coding algorithm, the amount indicated by said indicating means each time a coin is deposited,
- said transmitting means responsive to said coding means transmitting said coded amount to said office via said communication path.

11. In combination,
a telephone system comprising
- means for providing coin control signals, and
- a frequency shift key (FSK) receiver, a coin station connected to said telephone system comprising
- means responsive to one of said coin control signals for randomly choosing a coding algorithm,
- FSK transmitting means for transmitting the identity of the chosen algorithm in an FSK format to said FSK receiver,
- means responsive to coins deposited at said station for indicating a cumulative coin deposit amount, and
- means for coding said cumulative coin deposit amount in accordance with said chosen coding algorithm,
- said FSK transmitting means transmitting the coded cumulative coin deposit amount in an FSK format to said FSK receiver, and said telephone system further comprises means responsive to said FSK receiver for decoding the coded cumulative coin deposit amount in accordance with said chosen algorithm identity information to derive said cumulative coin deposit amount.

* * * * *